United States Patent [19]

Onishi et al.

[11] Patent Number: 4,770,378

[45] Date of Patent: Sep. 13, 1988

[54] DEVICE FOR FIXING CONDUITS TO SADDLES

[76] Inventors: Yoshio Onishi, No. 31-19, Ageo-cho, 2-chome, Yao-shi, Osaka-fu, Japan; Nobuo Ogawa, No. 120-1, Shimokosaka, Higashiosaka-shi, Osaka-fu, Japan

[21] Appl. No.: 118,285

[22] Filed: Nov. 6, 1987

[51] Int. Cl.$^4$ .............................................. F16L 3/22
[52] U.S. Cl. ...................................... 248/68.1; 248/73
[58] Field of Search ................. 248/68.1, 73, 72, 74.1, 248/74.4, 49, 62, 542; 24/576, 486; 174/163 R

[56] References Cited

U.S. PATENT DOCUMENTS

| | | | |
|---|---|---|---|
| 1,063,566 | 6/1913 | McFeaters | 248/74.4 |
| 2,384,158 | 9/1945 | Carpenter | 248/68.1 |
| 2,387,951 | 10/1945 | Slater et al. | 248/68.1 |
| 3,048,851 | 8/1962 | Bickford | 248/297.2 X |
| 3,263,947 | 8/1966 | Kerttunen | 248/68.1 |
| 4,254,930 | 3/1981 | Warren | 248/542 |
| 4,267,870 | 5/1981 | Warner | 411/410 X |
| 4,611,776 | 9/1986 | Williams | 248/228 |

FOREIGN PATENT DOCUMENTS

| | | | |
|---|---|---|---|
| 2734415 | 2/1979 | Fed. Rep. of Germany | 248/68 R |
| 965856 | 9/1950 | France | 411/410 |
| 1524213 | 5/1968 | France | 248/74.4 |
| 56873 | 8/1944 | Netherlands | 248/73 |
| 1579904 | 11/1980 | United Kingdom | 248/68 R |

Primary Examiner—J. Franklin Foss
Attorney, Agent, or Firm—Henry C. Nields

[57] ABSTRACT

A device is to secure conduits on saddles comprising grooved rails transversely with an axial line of the conduit, provided with a foot projecting engaging parts laterally for the suspending wall, holding curves continuing from the foot, a main body having projections forward from the end of the holding curve, and a vane plate whose sides have the length equal to or more than the inner width of a flange and other two sides are shorter than said two sides, and which has a female screw at the center portion. The vane plate is disposed under the seat part, and is screwed with a stem of the screw member inserted in a passage of the seat part, and is pulled upward by an elastic body disposed around the stem between the head of the screw member of the vane and the seat part, and the vane plate is contacted to the suspending wall of the saddle by rotating down the screw member, and the conduit is fixed temporarily. Under this condition, the vane is moved upward and forcibly contacted to the suspending wall by rotating the screw member.

23 Claims, 10 Drawing Sheets

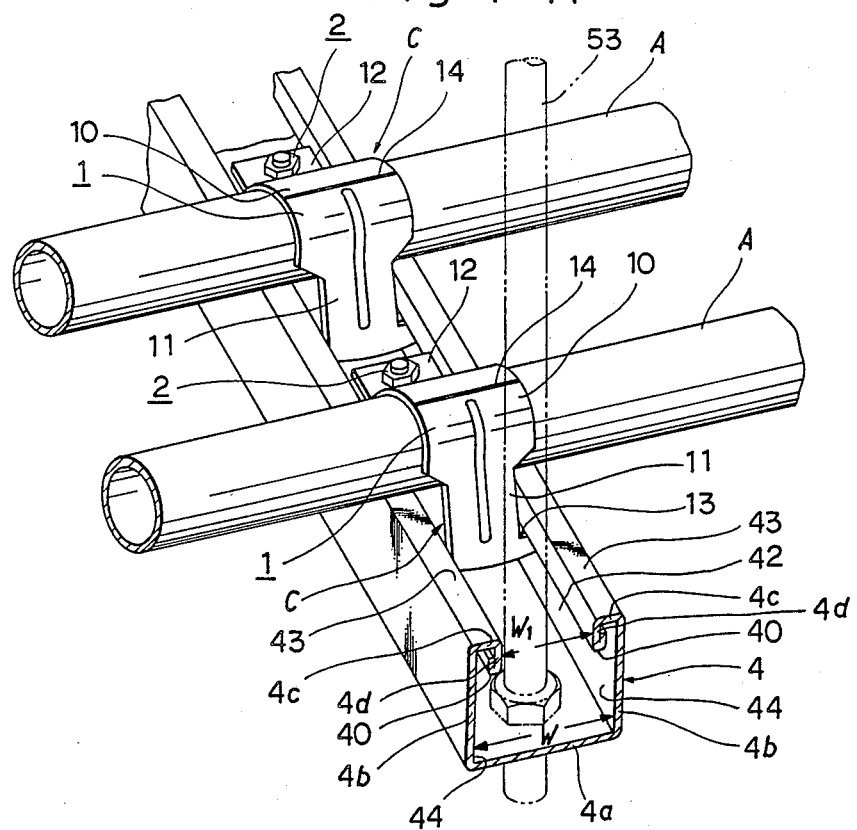
Fig. 1-A
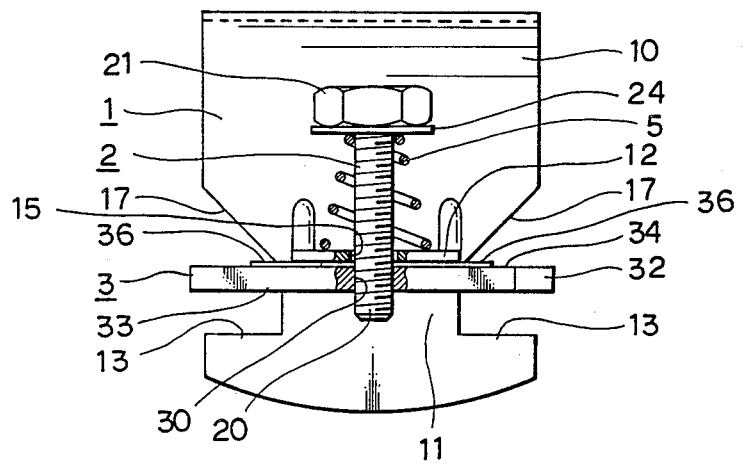
Fig. 3

Fig. 2-A
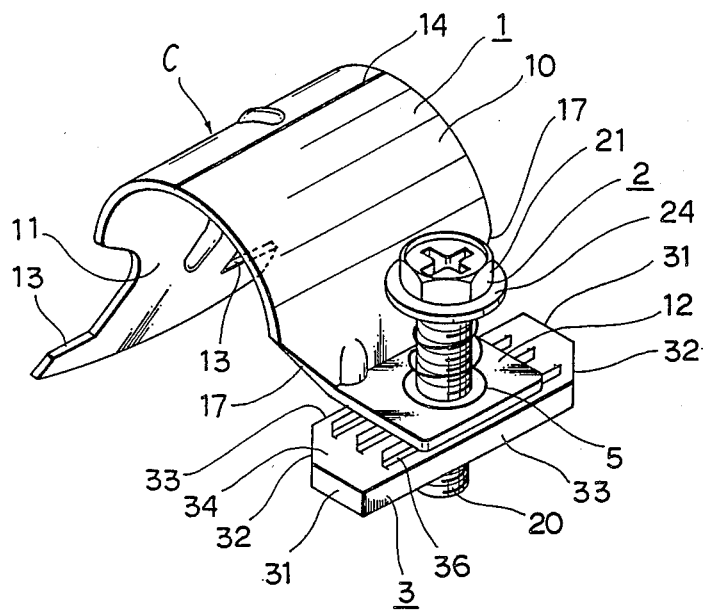
Fig. 2-B
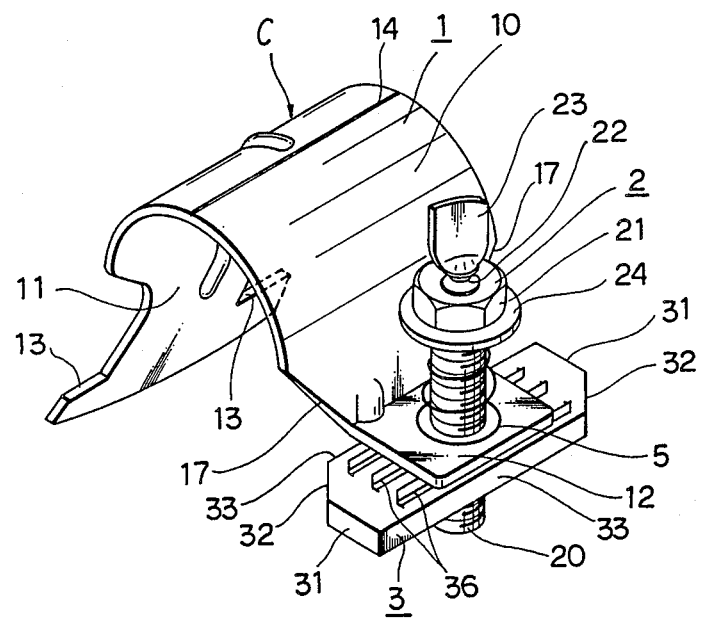

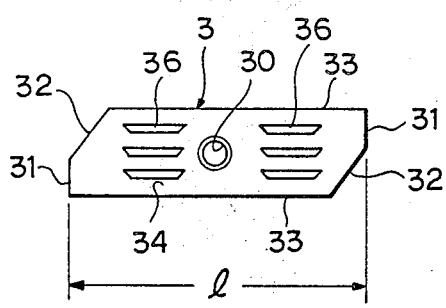
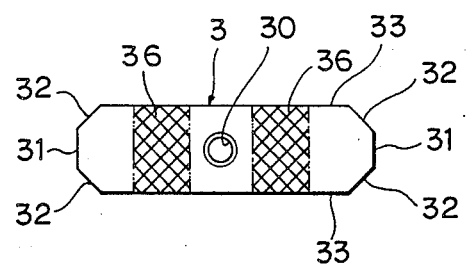
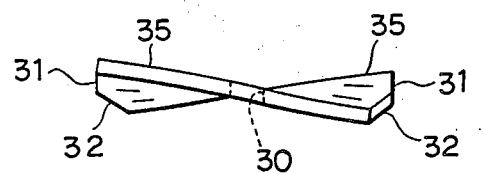
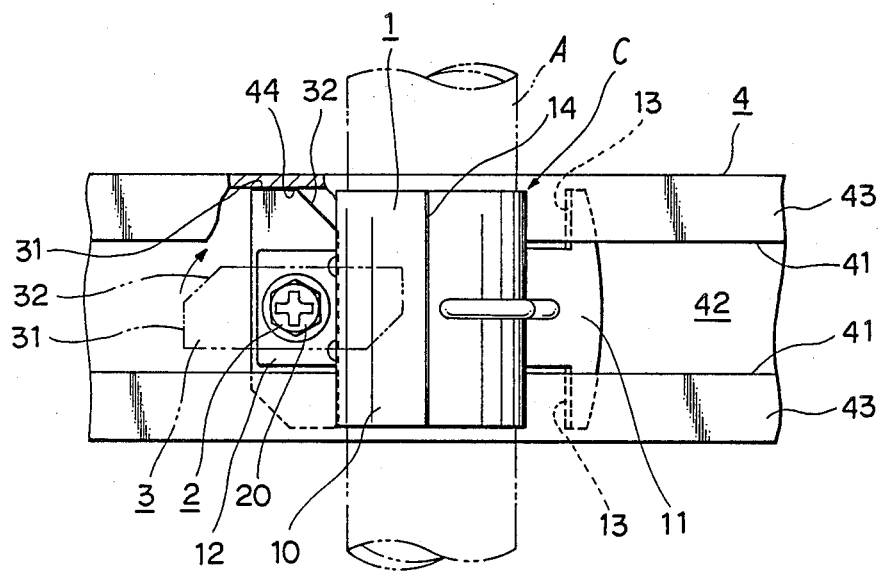

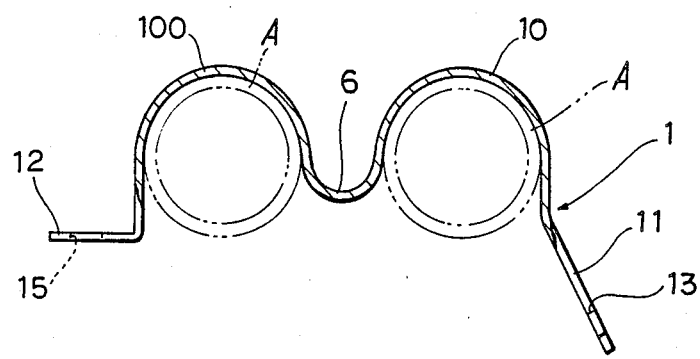
Fig.12-A
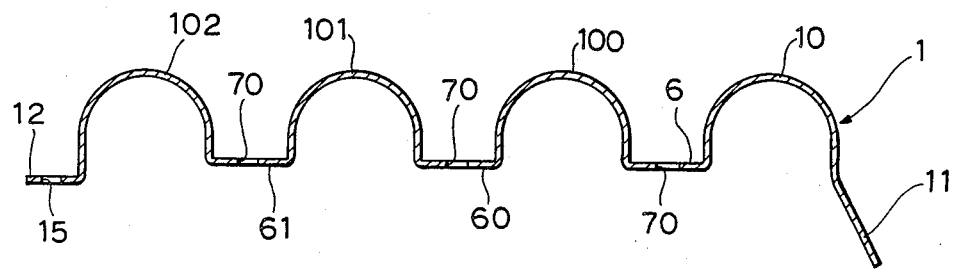
Fig.12-B
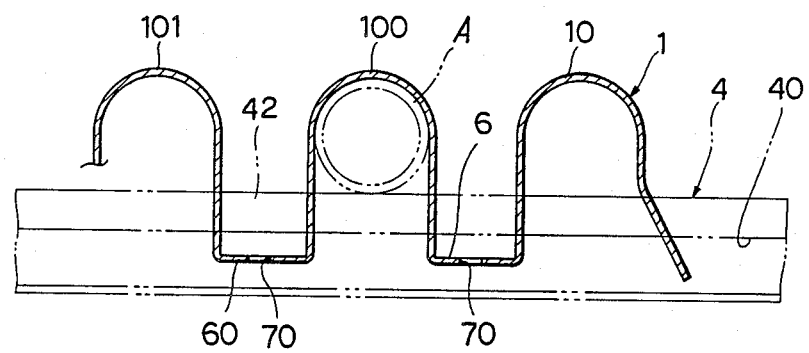
Fig.12-C

Fig. 13-A
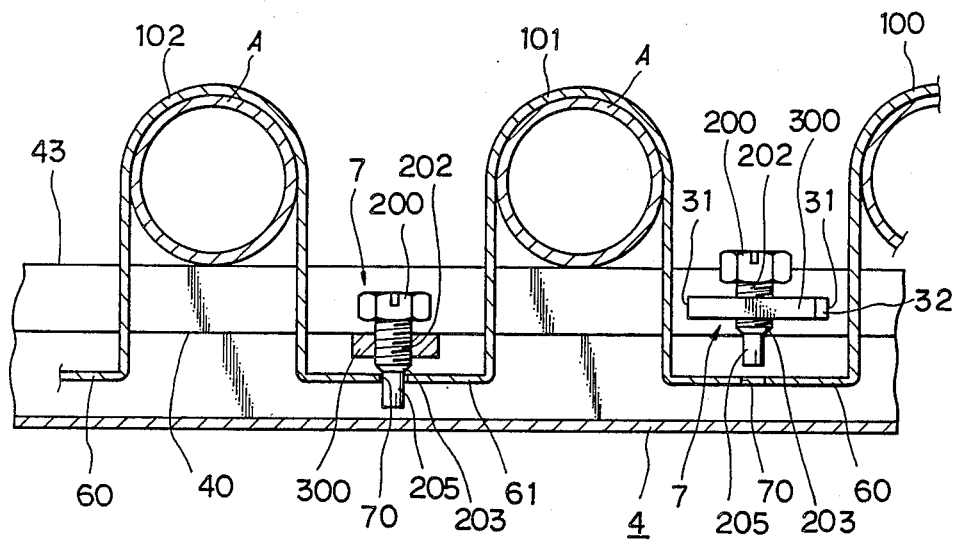
Fig. 13-B
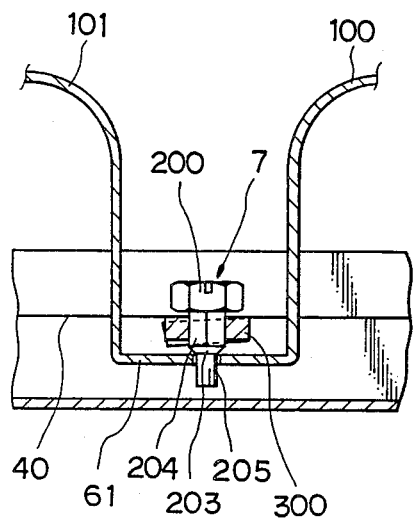
Fig. 13-C
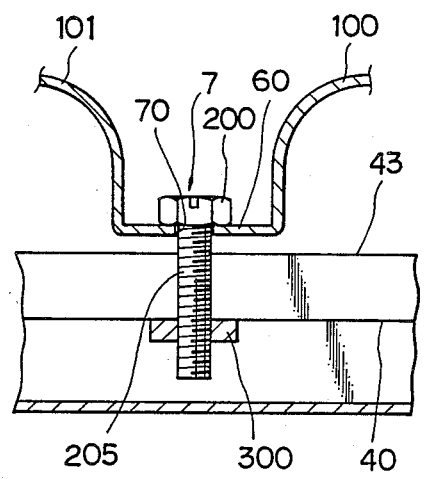

DEVICE FOR FIXING CONDUITS TO SADDLES

BRIEF DESCRIPTION OF THE INVENTION

The present invention relates to a fixing device of conduits, and more particularly to a device for fixing electric wires or fluid conduits to saddles comprising groove shaped rails.

Wires or cables for electric supply, transmission or telephone are laid in concrete-made buildings such as houses, stores, business offices, warehouses, factories, rail road stations, air port buildings, gymnasiums, theaters, or wooden buildings, tunnels, subways and others (called electric wires or cables briefly as "wire" or "wires" hereinafter").

For avoiding damages of shields of the wires, chemical changings in qualities by rain or contacting to concrete, mortars, and affections by electromagnetic waves, there have been employed such manners that the wires are passed through metal conduits, and laid transversely on saddles which are disposed equidistantly on ceilings, side walls or floors, and secured by means of fixtures.

The saddle comprises a groove shaped rail, and a fixture of holding a conduit in the groove-shaped rail is in general composed of a pair of metals and bolts. One of the pair of metals has a hook to a pending wall of the rail at its lower end, and has a passage of larger diameter than that of the bolt at its upper part. The other metal is made in the same shape and size as the former one excepting that the latter has a screw hole, not a passage.

However, in such a structure, when the conduit is fixed to the saddle, the both metals are disassembled and are set into the groove-shaped rail independently, and then the conduits are faced in opposition and set up with the bolts. The disassembled metal are erroneously positioned with ease and so screwing cannot be done at the metal having the screwed hole. Therefore, working efficiency is very inferior.

Further, forcible screwing would open the lower part of the metal, and fixture is insufficient in spite of large force. In addition, the upper part of the metal is extruded in a radius direction of the conduit, and the bolt is easily unscrewed.

As a countermeasure thereto, the present inventors proposed a fixture in Japanese Utility Model Application No. 4,301/1981. This proposed fixture has a structure where an engaged portion is formed at one end of a curved part to be fitted in a pipe, and a screw is connected in idle rotation at its lower end with an eyelet to a horizontally extended portion at the other end of the curved part of a main body thereof, and a screw shaft between a screw head and the extended portion is screwed with a vane plate shorter than the opposite two sides and other two sides.

According to this fixture, the curved part is placed on the pipe, and when the screw is rotated, the vane plate is rotated, the two sides of the vane plate are contacted to the inner side of the saddle, and the vane goes upward along the screw shaft so that the upper face of the vane is tightened in contact to the pending wall. Thus, the above mentioned problem was solved. However, there still remain following problems.

Firstly, temporary fixture could not be easily provided. For securing the pipes to the saddles equidistantly and in parallel with each other in accordance with specification of construction, it is necessary to lightly hold the pipes on the saddles, correct errors in placing and fix them in place. But in the proposed fixture, the screw is not moved axially, and the elevation of the vane plate is in proportion to the rotating number of the screw. Therefore, rotations are much required for the temporary fixture. If the vane is too forced, the pipe could not be moved.

Secondly, the fixture is difficult to be mounted on the pipe. In this preceeding device, the lower part of the screw is connected in idle rotation to the extended part, and the vane is positioned on the extended part. Thereby, the curved part is very lengthy. It is difficult to fit the curved part onto the pipe under the condition that the fitting part is positioned in the groove of the saddle. For avoiding these difficulties, a means is required for providing hinges at upper parts than the fitting part.

Thirdly, the fixture is of large size, and the piping spaces could not be made small. The vane is more than 90° at the upper part of the extended portion which is secured by the eyelet with the lower end of the screw. Therefore, the length of the extended part is very large, and the size is large between the fitting part at one end of the curved part and the end of the extended part. As a result, the piping space is limited so that close arrangement is difficult. As the extended part is large, thick plates should be required.

Fourthly, the production thereof is troublesome. The lower end of the screw is, in the proposed device, provided in idle rotation to the extended part under the condition that the vane plate is secured to the screw. The main body is curved in three dimension due to the curved part and fitting parts.

SUMMARY OF THE INVENTION

The present invention has been devised to solve the above mentioned problems.

It is an object of the invention to provide a fixture device of conduits, which is simple in structure and small in size, and could maintain assembled condition before use, carry out temporary fixture of the conduit to the saddle in use by one touch operation and fix the screw members to the saddle by only rotation exactly and firmly.

It is another object of the invention to provide a fixture device of conduits, which could prevent overtightening of the conduit to the saddle, and observe finishing and unfinishing of fixture of the conduits.

It is a further object of the invention to provide a fixture device of conduits, which could fix a plurality of conduits to the saddles accurately and securely by one touch and rapidly.

For accomplishing the above mentioned objects, the present invention comprises an oblique foot having an engaging part for an edge of a pending wall of the saddle, a holding curved part continuous from the foot, a main part having a seat plate projecting from the lower part of the holding curved part, a vane plate whose two sides are longer than an inner width of the saddle and other two sides are shorter than that, a female memebr, and an elastic member, and wherein the shaft of the screw member is idle in a hole formed in the seat plate, the vane is screwed into the shaft under the seat plate, and the elastic member is interposed between the head of the screw member and the seat plate, the screw member is pulled up by elasticity of the elastic member, so that the vane plate is normally contacted to the lower part of the seat plate.

The invention may use a screw member having a polygonal first head and formed thereon with a second head via a reduced portion in cross sectional area.

The main part of the invention includes one having a center indication part almost corresponding to the axis of the pipe on the outer face of the holding curved part. Further, the main part includes one having at least one holding curve via connection continuous from the holding curved part, and includes one separable in the holding curved part via the connection, and also includes one having an intermediate tightening mechanism at the connection.

The conduit or conduits of this invention include many kinds of pipes of synthetic resins such as vinyl chloride other than ferrous, cupper and other metals, and also include those for flowing liquid and gas other than those passing the wires.

BRIEF DESCRIPTION OF THE DRAWINGS

FIG. 1-A is a partially enlarged view of the above;

FIGS. 2-A and 2-B are perspective views of a first embodiment of the invention;

FIG. 3 is a view, partially in section, of FIG. 2-A;

FIG. 4-A is a plan view showing one example of a vane of the invention;

FIG. 4-B is a plan view showing another example of a vane;

FIG. 4-C is a side view showing a further example of a vane;

FIG. 5 is a plan view, partially in section, showing temporary fixing by the embodiment of FIG. 3;

FIGS. 12-A to 12-C are side views, partially in section, exemplifying the second embodiment of the invention;

FIGS. 13-A to 13-C are vertically front views showing intermediate fixtures.

DETAILED DESCRIPTION OF THE INVENTION

The present invention will be explained with reference to the attached drawings.

Figure 1:
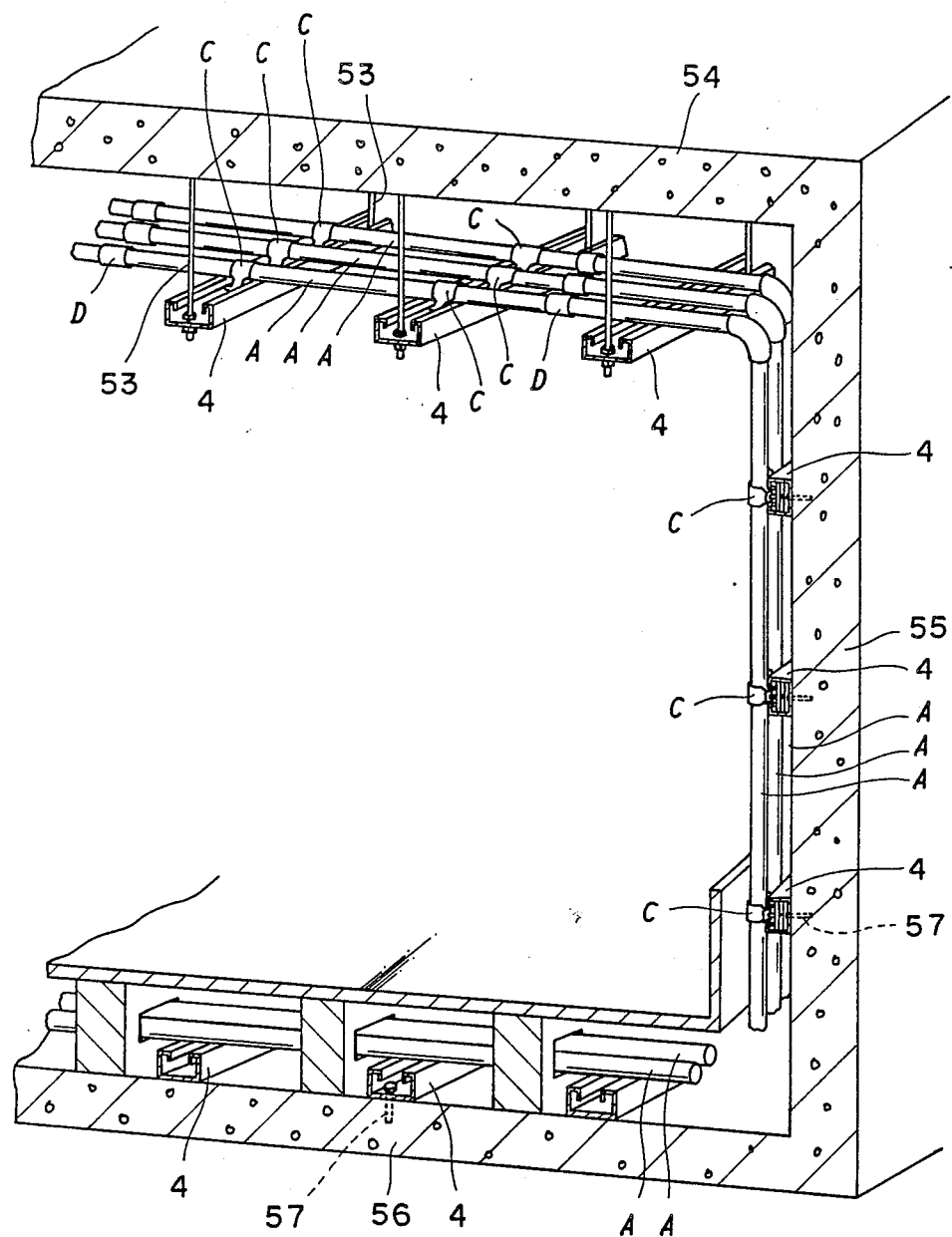
FIG. 1 is a perspective view showing fixture devices of the invention in use.

FIG. 1 shows an example where the devices are used to fixing of conduits laid within concrete structure. 4, 4 are saddles fixed in parallel with spaces smaller than length of conduits A (e.g. 3 to 5 m) in accordance with piping project.

For example, at a ceiling area, a set comprising a plurality of rods 53, 53 are suspended from a ceiling 54, and they are connected at lower parts with end parts in length of of saddles 4 by means of nuts or welding. At side wall 55 or floor 56, the saddles 4 are fixed by bolts, nails 57 or welding.

The saddle 4 comprises a groove shaped rail. As shown in FIG. 1-A, it has a web (bottom) 4a and a flange (side walls) 4b. 4b standing at the both sides of the web. The flanges 4b, 4b are integrally formed with top walls 4c, 4c extending to the width direction thereof. The top walls 4c, 4c are bent at ends in right angle to form suspending walls 4d, 4d, whereby an inlet groove 42 of width W1 smaller than an inner width W of the flange is formed.

A conduit A is laid transversely on the saddles 4, 4, and is extended in succesion by means of screwless coupling sleeves D. The conduit A is fixed to the saddle 4 by a device C of this invention.

FIGS. 2-A, 2-B and 3 show fundamental structures of the present device. A main part 1 is formed by stamping or pressing a band sheet of arbitrary metal as aluminium or cupper, or compressing synthetic resins. The main part 1 has a holding curve 10 of curvature having access to the conduit A at least $\frac{1}{3}$ of circumference thereof, and a foot 11 of oblique angle being, e.g., 20° to 40° with respect to perpendicularity. As seen from FIG. 1, the foot 11 has engaging parts 13, 13 at its lower part, projecting laterally for edges 40, 40 of the suspending walls of the saddle 4. The foot 11 has a smaller width than the inlet groove width W1 of the saddle 4.

The main part 1 of the device is formed with a center indication 14 at an outer surface of the center of the curvature of the holding curve 10, that is, a portion to be alighned with the axial line of the conduit in order to easily determining spaces for securing the conduits A to the saddles 4. This center indication 14 is shown with a groove, but may be a projection or line coated with paint. This is not necessarily formed over full length in the width of the holding curve, and the line may be a dotted line.

The holding curve is formed horizontally with a seat part 12 in opposition to the foot 11, defined with a passage 15 larger than a screw member in diameter. The holding curve 10 is formed with taper edges 17, 17 of desired oblique angle from the end of the seat part 12.

A screw member 2 has a head 21 and a stem 20 threaded with a male screw, the stem being passed through a passage 15 of the seat 12.

A vane plate 3 is disposed under the seat 12 for tightening, and is formed with a female screw 30 at its center for passing the screw stem 20. The vane 3 is shaped other than a real circle, that is, shaped in plain having difference in length between sides 31, 31 and other sides 33, 33, and the maximum size is equal to or more than the inner width W of the flange of the saddle 4.

A cylindrical elastic body 5 is represented by compression spring, preferably conical spring. The elastic body 5 is disposed between the seat part 12 and the head 21 of the spring member 2, and biases upward the head 21 due to its elasticity, so that the whole body of the screw 2 is pulled upward, and the upper surface 34 of the vane 3 is contacted to the lower surface of the seat part 12. A washer 24 is placed under the head 21 of the screw 2, and it may be integrally formed with the head 21. If the head has a large diameter, the washer is not required.

The screw member 2 shown in FIG. 2-A is a normal type formed with a head having a driver groove, and it may have an overtightening check means as shown in FIG. 2-B. The stem 20 is formed at its top with a first head 21 which is formed at its top with a portion 22 which is reduced in cross section so as to break this portion when a torque comes to a certain extent. The cross section reduced portion 22 is formed with a second head 23 of flat shape.

FIGS. 4-A to 4-C show embodiments of vane plates. FIG. 4-A shows that a pair of sides 31, 31 make a maximum length l, and guide sides 32, 32 are formed at opposite corners. FIG. 4-B shows that a pair of sides 31, 31 make a maximum length, and guide sides 32, 32 are formed at four corners. In FIG. 4-A, if the length between a pair of sides 31, 31 is larger than the inner width W of the flange, it may meet many widthes of the flange grooves. The vane plate of FIG. 4-B is not limited in whirling direction, and its handling is easy.

FIG. 4-C shows that waves 35, 35 are symmetric at a female screw 30, and become higher as going toward rotating directions. In this case, the vane plate 3 may be moved upward by small rotation amount of the screw member 2 due to the waves 35, 35, and do tightenihg by the spring effect.

The vanes 3 are not limited to those shapes shown in the above mentioned examples, but sufficient with those which are moved up along the lead of the stem 20, and contact to the edges 40, 40 of the suspending walls of the saddle 4. The guide faces 32, 32 and the sides 33, 33 are not necessarily straight but may be arc-shaped. The edge sides 31, 31 may be formed with strips or means for increasing friction coefficient. As shown in FIG. 4-A or 4-B, it is possible to form roulette, waves or other friction coefficient increasing parts 36.

Figure 10:
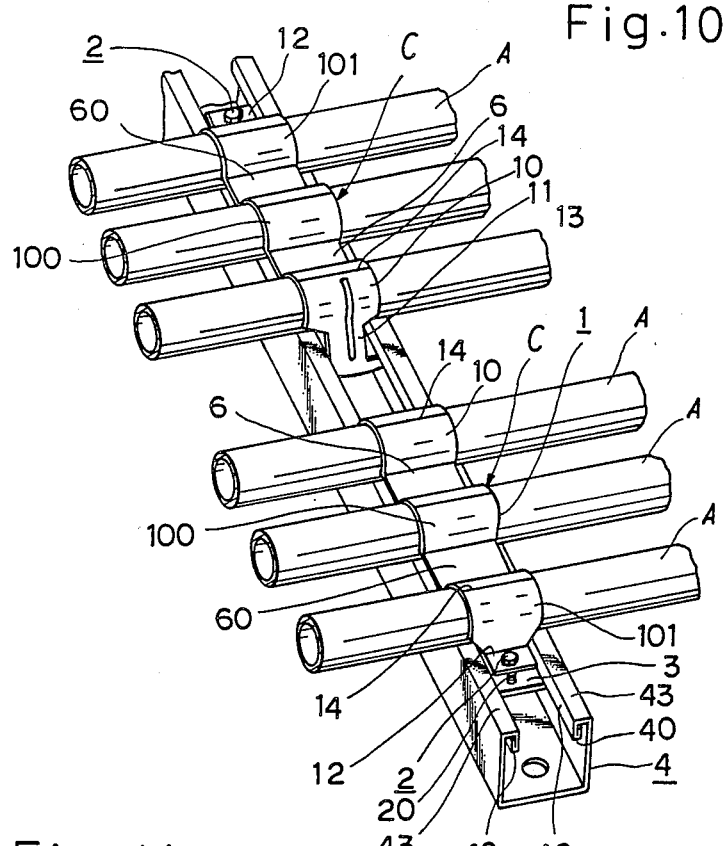
FIG. 10 is a perspective view showing a second example of the invention in use.
Figure 11:
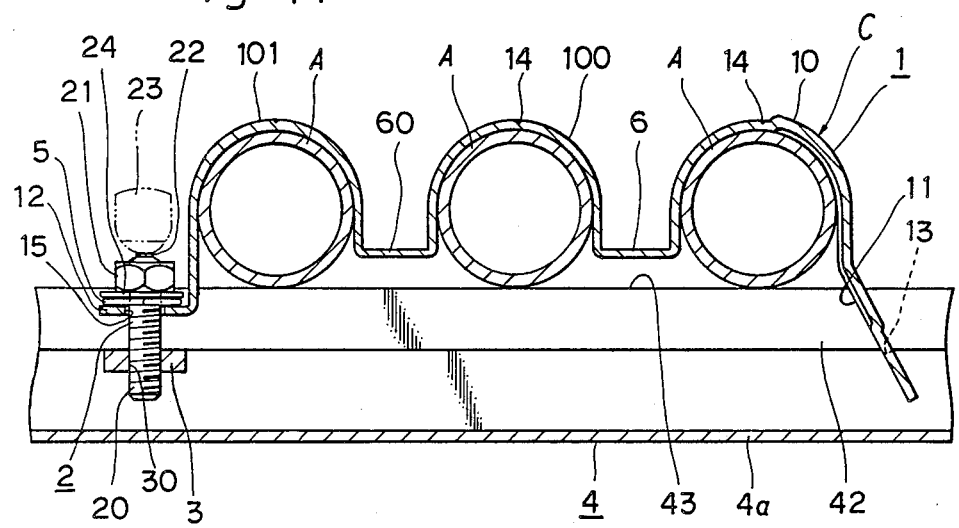
FIG. 11 is a vertically side view of the same.

FIGS. 10 and 11 show another embodiment of the invention. In this embodiment, a first holding curve 10 is formed continuously from the foot 11, which has a curvature having access to a conduit A to be fixed at least ⅓ of circumference and a width larger than width of groove at an inlet, and is formed with a connection 6 of a required length at a falling end of the curve 10.

The connection 6 is formed with a second holding curve 100 standing at the other end thereof and continuing a connection 60 of a required length at a falling end of the curve 100. The connection 60 is formed at its forward with a third holding curve 101 (last one in this embodiment).

The final holding curve 101 is formed with a short seat part 12 almost horizontally at its falling end as seen in FIGS. 2-A, 2-B and 3, and is provided there with an assembly of a screw 2, vane 3 and elastic body 5 as in the same. The details thereof have been almost stated, and so the same figures will be used.

FIGS. 12-A to 12-C show examples of multi-type. FIG. 12-A shows that a first holding curve 10 following the foot 11 is formed with a second holding curve (final) 100 via a connection 6, which is projected with a seat part 12 at a falling end thereof. FIG. 12-B shows that a fourth holding curve (final) 102 is continued via the connection 61 from the falling end of the third curve 101 in the embodiment of FIG. 10, and is projected with a seat part 12. In the above embodiments, the connections 6, 60, 61, 62 have larger widths than the width W1 of the inlet groove of the saddle, and heights that they do not contact the upper surface 43 of the saddle 4 until finishing tightening by the vanes 3. FIG. 12-C shows that the connections have smaller widths than the width W1 of the inlet groove of the saddle 4, and the heights of the connections 6, 60 have sizes that they reach under the inlet groove 42 of the saddle 4.

The connections 6, 60, 61, 62 . . . are not necessarily straight, but may be curved as shown in FIG. 12-A. Further, each of the connections may be curved upward as coming near to the final holding curve.

The lengthes (contacting length to circumferential face of the conduit) of the arcs of the holding curves 10, 100, 101 may not be equal. For example, it is permitted that the lengthes of the arcs of the first and final curves are made large, and other curves (shown with "100" in FIG. 11, and "100", "101" in FIG. 12-B, and "100", "101", "102" in FIG. 12-C) are made small in the arc lengthes.

FIGS. 13-A to 13-C show that the connections 6, 60, 61 . . . are provided with intermediate tightening means 7 which has a boss hole 70 formed in the connections 6, 60, 61 . . ., a bolt 200 having a shaft 205 idle therein, and a vane 300 which is moved up along the shaft 205 by rotation of the bolt 200 and contacts the edges 40, 40 of the suspending walls of the saddle 4. FIG. 13-A shows that the bolt 200 has a male screw 202 larger in diameter than the boss hole 70, passing through the vane 300, and is formed at the lower part of the male screw 202 with stem 205 smaller than the boss hole 70 via a taper or a step 203.

FIGS. 13-B shows that a polygonal or oval part 204 is substituted for the male screw, into which a vane plate 300 of the same shaped hole is applied, so that the vane 300 is rotated by rotation of the bolt 200, and said part 204 is formed at its lower part with a shaft 205 via the taper or a step 203.

In FIGS. 13-A and 13-B, if the connection is formed in deep position as shown in FIG. 12-C, the embodiment is effective, and it is selected to a desired portion as a part indepenedet of the fixture 1.

FIG. 13-C shows that the boss hole 70 is inserted with the stem 205, and the part under the connection 60 is mounted with the vane 300 by utilizing a comination of the screw member and the vane plate. This embodiment is used to a shallow connection.

Figure 6:
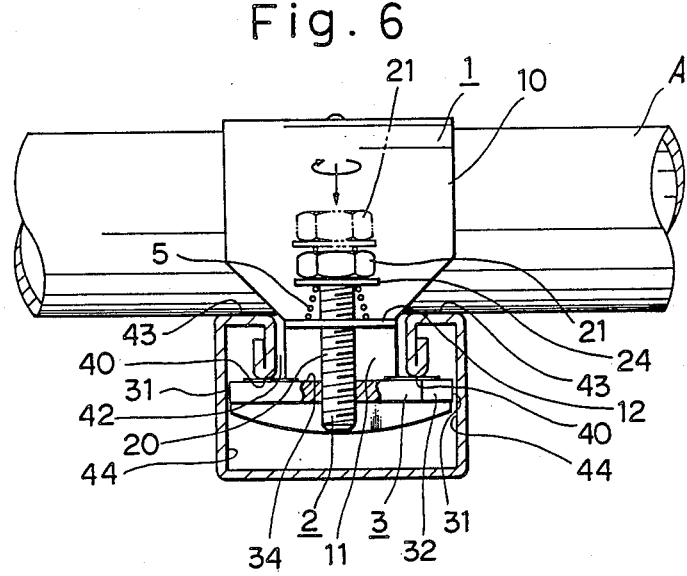
FIG. 6 is a vertically front view of the above.

The vane plates shown in FIGS. 13-A to 13-C may be those shown in FIGS. 6-A to 6-C. The bolt 200 may be a torque regulated screw as shown in FIG. 2-B.

Figure 14:
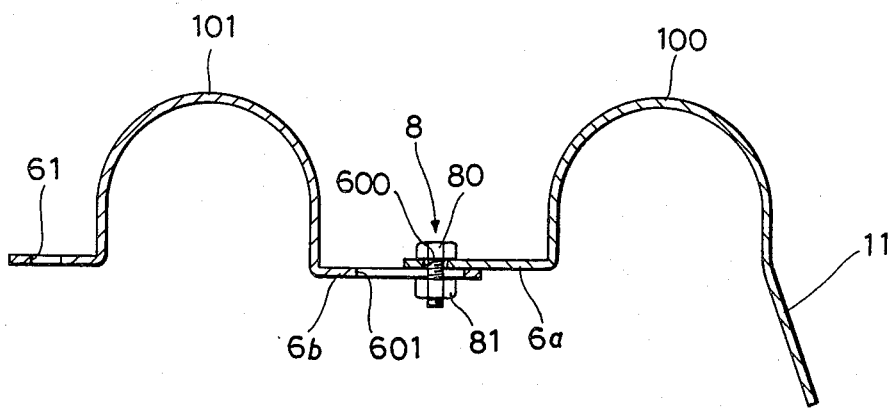
FIG. 14 is a vertically front view showing a connecting mechanism.

FIG. 14 shows that a length regulating means 8 is provided for changing the distance between the holding curves 100 and 101. With this means 8, the connections of the curves 100, 101 are divided into two at middle parts, and connecting pieces 6a, 6b are formed, and they are connected or separated by a bolt 80 and a nut 81. One connecting piece 6a is formed with a passage 600 for the bolt 80, and the other connecting piece 6b is formed with an oblong hole 601. According to this system, the length of the connectioin is optional by releasing the nut 81 and sliding one of the pieces and tightening the nut 81. Further, depending upon this mechanism, the number of the conduits to be fixed can be changed by preparing intermediate parts having the holding curves of optional number.

A reference will be made to usage and service of this invention.

Figure 7:
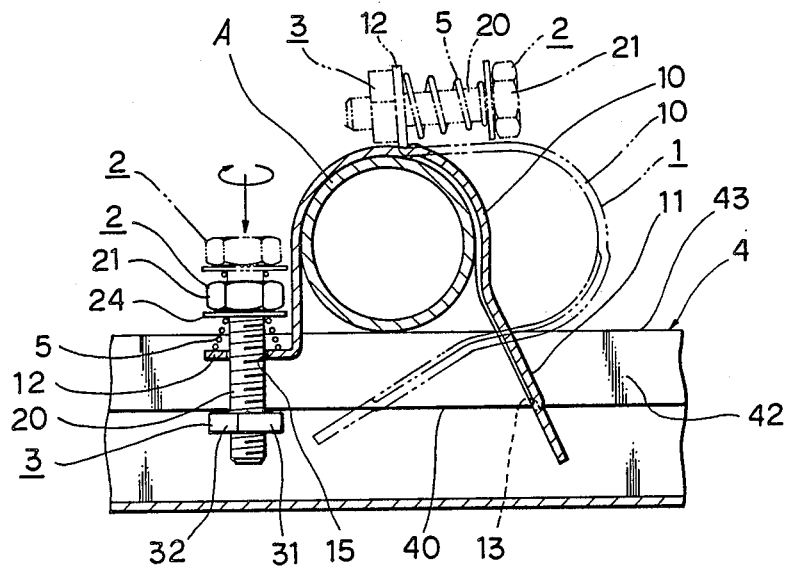
FIG. 7 vertically side view of the same.
Figure 8:
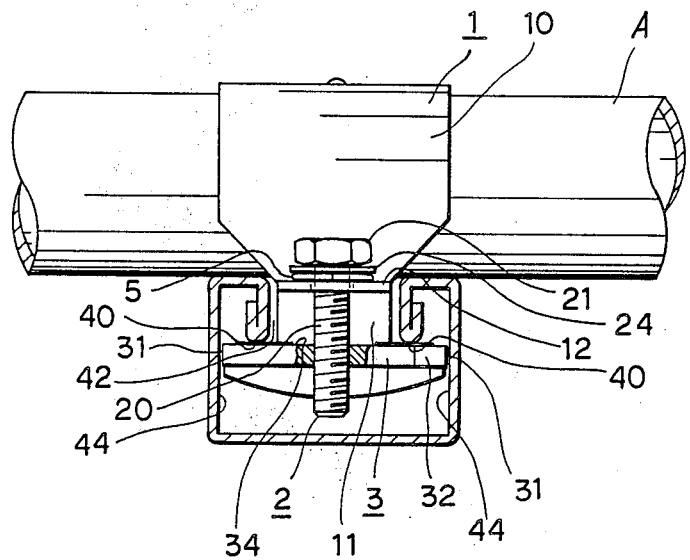
FIG. 8 is a vertically front view showing fixture of a conduit.
Figure 9:
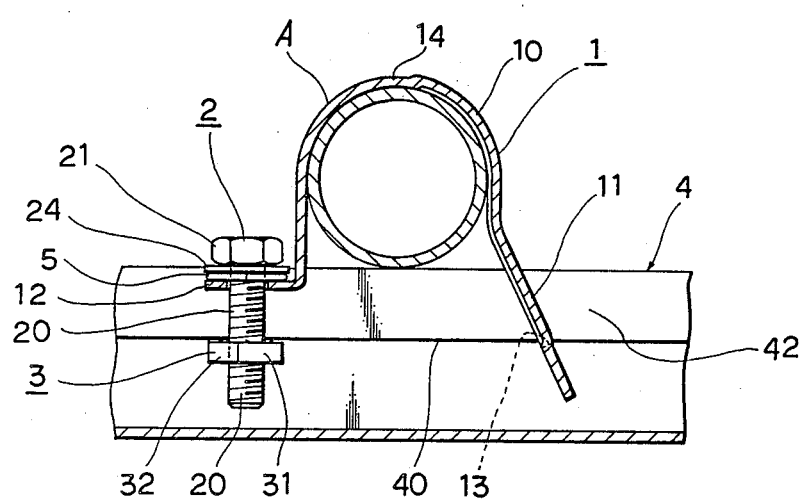
FIG. 9 is a vertically side view of the above.

FIGS. 5 to 9 show examples emboding the device of FIG. 2-A, FIGS. 5 to 7 show temporary fixture, and FIGS. 8 and 9 show fixing conditions.

As seen in FIG. 2-A, the elastic member 5 moves up the vane 3 to the seat 12, and therefore the vane 3 is not dropped from the stem 20 by error and a preferable assembling state may be kept.

For setting the present device to the saddle 4, the width direction of the foot 11 is made parallel with the inlet groove 42 of the saddle 4 and under this condition the former is inserted into the latter, and the device is rotated such that the width of the foot is transverse with the saddle 4. Thus, the setting is made by one touch.

Under this condition, the conduit A is fixed to the saddle 4 temporarily by tilting the whole of the device such that the curve 10 opens as shown with an imaginary line in FIG. 7, and bringing it to the conduit A.

Thereby, the conduit A is easily set to the holding curve 10. At this time, since the screw 2 and the vane 3 are pulled up by the elastic member 5, the operation is easy. The vane plate 3 is regulated so that the sides 31, 31 are made parallel with the inlet groove 42. When the hand is released, the holding curve 10 is laid naturally since the seat part 12 is heavy. The conduit A contacts the upper surfaces 43, 43 of the saddle 4, and is surrounded by the holding curve 10, and the engaging parts 13, 13 are engaged with the edges 40, 40 of the suspending walls of the rail member 4.

If the screw member 2 is rotated around 90° against the elasticity of the elastic member 5, the screw member 2 and the vane 3 advance under the inlet groove 42. The vane 3 is rotated in association with the screw member 2 when the screw member 2 starts to rotate, but since the distance between the sides 31, 31 is equal to or more than the inner width W of the flange, the sides 31, 31 contact the inner faces 44, 44 of the flange and the vane is no longer rotated.

Then, if pressure of the screw member 2 is released, the screw member 2 is pulled up by recovery of the elastic body 5, and the upper face 34 of the vane 3 contacts elastically the edges 40, 40 of the suspending walls, and the conduit A is held by this elasticity. Under this condition, the device 1 can be moved to length of the saddle, and so the conduit A may be conditioned freely.

When the positioning of the conduit is finihsed, the screw member 2 is rotated. Since the vane 3 is prevented from rotation by contacting the inner faces 44, 44 of the flange, it is moved up along the stem 20, and the upper surface 34 of the vane is pressed to the edges 40, 40 of the suspending walls. At the same time, since the foot 11 is pulled upward and the curve 10 is pulled down, the curve 10 is closely contacted to the outer circumferential surface and the fixture is accomplished. The elastic body 5 is compressed in flat shape, and if vibration is caused, the screw member is not loosened.

For the above mentioned operation, the fixture is done by the seat part 12 via the elastic body 5 under the condition the head of the screw 2 is supported, and the rotation torque can be easily given to the screw member 2 without causing unstability as when the stem is stood on the seat part in that the lower end of the stem is provided to the seat part in idle rotation.

If the screw shown in FIG. 2-B is used and since it has the second head 23 of flat shape on the first head 21 via the cross section reducing part 22, the temporary fixture may be made without using a driver or rench. Since the cross section reducing part 22 is broken when a speficied torque is got, there is no danger causing deformation or damage by tightening the conduit A by the curve 10 by force more than unnecessary. It is possible to observe that the second head 23 is broken from the side of the saddle 4, and the working is finished or not.

In this kind of construction, the conduits A are required to be secured to the saddle in parallel with specified spaces as seen in FIG. 1. If the holding curve 10 is marked with the center indication 14, it may be met with the axial line of the conduit A, and the conduits can be positioned and secured with the required space.

In structure, the screw 2 is inserted into the seat part 12, and the vane plate 3 is screwed to the stem 20 under the seat part 12, and it is sufficient that the seat part 12 has only a size to support the head 21. Therefore, the lenght and width of the projection may be small, so that the whole of the device can be made in compact. As a result, the piping space of the conduits can be small.

In the embodiment shown in FIGS. 10 and 11, the whole of the device 1 is titled under the condition that the foot 11 is positioned within the saddles 4, 4, and the holding curves 10, 100, 101 . . . are opened in lateral directions, and the conduits A, A, A are positioned under the curves 10, 100, 101, and the fixture 1 is laid such that the sides 31, 31 of the vane 3 are made parallel with the inlet groove 42.

Thus, the conduits A, A, A are surrounded by the holding curves 10, 100, 101 . . . under that the lower surfaces of the conduits are contacted to the upper surfaces of the saddles 4, and the engaging parts 13, 13 of the foot 11 are engaged with the edges 40, 40 of the suspending walls of the saddles 4.

The temporary fixture is the same as said above. The final fixing operation is also the same. The vane 3 is not rotated by the rotation of the screw member 2 but moved upward along the stem 20, and the upper face 34 is forcibly pressed to the edges 40, 40 of the suspending walls. The foot 11 is pulled up, and the final holding curve is pulled downward. As a result the conduit A presses the wall of the holding curve biasing to the connection, and the middle curve(s) are effected with elastic deformation in the diameter reducign side. Thereby, the holding force of the middle curves is increased, and the conduits A, A are secured as in FIG. 11. If the conduit is made of synthetic resin, the holding curve closely contacts the outer circumference of the conduit due to its own elasticity. In either way, the fixture may be made at once with determined and necessary spaces.

If the tightening mechanisms 7 as shown in FIGS. 13-A to 13-C, the bolts 200 are inserted into the boss holes 70 formed in the connections 6, 60, 61, and when they are rotated, the vanes 300 are moved upward along the stems, and contact the edges 40, 40 of the suspending walls. Therefore, the fixture may be firmly made, in spite of the number of the holding curves or the small diameter of the conduit.

If the length controlling mechanis 8 is used, the space between the holding curves may be changed in accordacne with the length of the connection or the specification of the construction.

What is claimed is:
1. A device for laying and fixing conduits to saddles disposed transversely with pipe axial line, wherein
 a. said device comprises a main body, a screw member, a tightening vane plate, and an elastic body;
 b. the main body has an oblique foot having lateral projecting parts for engaging a saddle, a holding curve continuing from the foot, and a seat part projecting from a lower part of the holding curve, the seat part being formed with a passage;
 c. the screw member has a head portion and a stem portion, the latter being idle in the passage, the vane plate is disposed under the seat part, the stem is threaded with a male screw and the vane plate is formed with a female screw at its center;
 d. the vane plate has two sides equal to or more than an inner width of the flange, and other two sides are shorter than them; and
 e. the elastic body is disposed around the stem portion between the head of the screw member and the seat part so that the screw member and vane plate received by said stem portion of said screw member are raised by elasticity relative to said seat part.

2. The device as claimed in claim 1, wherein the screw member is a bolt having a driver groove at its head.

3. The device as claimed in claim 1, wherein the screw member has a first head of polygonal shape on the stem and a second head attached to the first head via a portion that is reduced in cross section so as to break when the torque applied to said second head exceeds an upper limit.

4. The device as claimed in claim 1, wherein the elastic body is a coil spring including a conical spring.

5. The device as claimed in claim 1, wherein the vane plate is formed with guide faces at corners of the pair of sides the length between which is equal to or greater than an inner width of the saddle.

6. The device as claimed in claim 1, wherein the vane plate is formed with guide faces at both sides of the pair of sides the length between which is equal to or greater than an inner width of the saddle.

7. The device as claimed in claim 1, wherein the vane plate is twisted symmetrically about the female screw.

8. The device as claimed in claim 1, wherein the vane plate has a part for increasing friction coefficient number on the upper surface thereof.

9. The device as claimed in claim 1, wherein the main body of the device is formed of synthetic resin.

10. The device as claimed in claim 1, wherein the holding curve of the device includes a center indication corresponding to the pipe axial line.

11. A device for laying and fixing conduits on saddles disposed transversely with pipe axial line, wherein
   a. said device comprises a main body, a screw member, a tightening vane plate, and an elastic body;
   b. the main body has an oblique foot having lateral projecting parts, a holding curve continuing from the foot, at least one holding curve being formed via connections from the lower end of the holding curve, a seat part being formed forward from the lower part of a final holding curve, and the seat part being formed with a passage;
   c. the screw member has a head portion and a stem portion, the latter being idle in the passage, the vane plate is disposed under the seat part, the stem is threaded with a male screw and the vane plate is formed with a middle female screw at its center;
   d. the vane plate has two sides equal to or more than an inner width of the flange, and other two sides are shorter than them; and
   e. the elastic body is disposed around the stem portion between the head of the screw member and the seat part.

12. The device as claimed in claim 11, wherein more than one additional holding curves are formed via connections.

13. The device as claimed in claim 12, wherein said additional holding curves are separable via connections.

14. The device as claimed in claim 11, wherein the connection comprises means for controlling the length between the holding curves.

15. The device as claimed in claim 11, wherein the connection includes those which are tightened toward the saddle by means of a middle part tightening mechanism having a vane plate.

16. The device as claimed in claim 11, wherein the screw member is a bolt having a driver groove at its head.

17. The device as claimed in claim 11 wherein the screw member has a first head of polygonal shape on the stem and a second head on the top of the first head via a cross section reducing part.

18. The device as claimed in claim 11, wherein the elastic body is a coil spring including a conical spring.

19. The device as claimed in claim 11, wherein the vane plate is formed with guide faces at corners of a pair of sides forming maximum length thereof.

20. The device as claimed in claim 11, wherein the vane plate is formed with guide faces at both sides of a pair of side forming maximum length thereof.

21. The device as claimed in claim 11, wherein the vane plate is twisted symmetrically about the female screw.

22. The device as claimed in claim 11, wherein the vane plate has a part for increasing friction coefficient number on the upper surface thereof.

23. The device as claimed in claim 11, wherein the main body is formed of synthetic resin.

* * * * *